United States Patent
Graulich et al.

(10) Patent No.: US 7,216,037 B2
(45) Date of Patent: May 8, 2007

(54) METHOD AND SYSTEM FOR LOGISTICS QUALITY OF SERVICE MEASUREMENTS USING GPS

(75) Inventors: Markus Graulich, Stuttgart (DE); Phil Upshall, Charlton Kings (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/947,873

(22) Filed: Sep. 23, 2004

(65) Prior Publication Data
US 2005/0102103 A1 May 12, 2005

(30) Foreign Application Priority Data
Sep. 10, 2003 (DE) ................ 031 03 736

(51) Int. Cl.
*G01S 1/00* (2006.01)
*G01C 21/26* (2006.01)

(52) U.S. Cl. ............. 701/213; 340/996; 340/825.06; 340/825.05; 342/357.07; 342/357.13; 700/222

(58) Field of Classification Search ........... 701/213, 701/35; 340/994, 995.16, 988, 996, 825.06, 340/825.05, 989; 342/357.07, 357.09, 357, 342/12, 357.13, 357.06; 700/222
See application file for complete search history.

(56) References Cited

U.S. PATENT DOCUMENTS

| | | | | |
|---|---|---|---|---|
| 5,874,905 A | * | 2/1999 | Nanba et al. | ............ 340/995.2 |
| 5,931,888 A | * | 8/1999 | Hiyokawa | .................... 701/208 |
| 5,959,577 A | * | 9/1999 | Fan et al. | .............. 342/357.13 |
| 5,987,377 A | * | 11/1999 | Westerlage et al. | ......... 701/204 |
| 6,115,655 A | | 9/2000 | Keith et al. | |
| 6,408,233 B1 | | 6/2002 | Solomon et al. | |
| 2001/0026240 A1 | * | 10/2001 | Neher | ................... 342/357.07 |

(Continued)

FOREIGN PATENT DOCUMENTS

CA 2 305 633 A1 10/2001

(Continued)

OTHER PUBLICATIONS

"Indoor GPS" Global Locate Inc., c. 2002, San Jose, CA.

(Continued)

*Primary Examiner*—Jack Keith
*Assistant Examiner*—Tuan C. To
(74) *Attorney, Agent, or Firm*—Schmeiser, Olsen & Watts; John R. Pivnichny

(57) ABSTRACT

A method and device for monitoring the quality of service of logistic services. A shipping device, which is shipped along a travel route from a source location to a destination location, includes an electronic device. Times are logged at one or more locations during the travel. The electronic device includes: a GPS-indoor receiver device connected to a control logic, a storage connected to the control logic, a power supply, and an I/O interface. The control logic is arranged for logging, during the shipping device traveling time, datasets including at least the current Time of Day and the current geographic location information derived from GPS signals received en route into the storage. The log data is read out via the I/O interface. The log data is evaluated according to predetermined rules reflecting the quality of service of the actual shipping device shipping.

20 Claims, 4 Drawing Sheets

U.S. PATENT DOCUMENTS

| | | |
|---|---|---|
| 2002/0111819 A1 | 8/2002 | Li et al. |
| 2003/0046451 A1* | 3/2003 | Prabhakaran .................. 710/1 |
| 2003/0048218 A1* | 3/2003 | Milnes et al. ......... 342/357.07 |
| 2003/0083815 A1 | 5/2003 | Denton |
| 2003/0109988 A1* | 6/2003 | Geissler et al. ............ 701/213 |
| 2003/0195696 A1* | 10/2003 | Jones ........................ 701/201 |
| 2003/0195697 A1* | 10/2003 | Jones ........................ 701/201 |
| 2004/0203932 A1* | 10/2004 | Yamagishi et al. ......... 455/457 |
| 2004/0233041 A1* | 11/2004 | Bohman et al. .......... 340/10.1 |

FOREIGN PATENT DOCUMENTS

| | | | |
|---|---|---|---|
| JP | 06027221 A | * | 2/1994 |
| JP | 06111197 A | * | 4/1994 |
| WO | WO 02/47048 A2 | | 6/2002 |
| WO | WO 02/47048 A3 | | 6/2002 |

OTHER PUBLICATIONS

"ARM922T Architecture", Altera Corp., c. 2004, San Jose, CA.

* cited by examiner

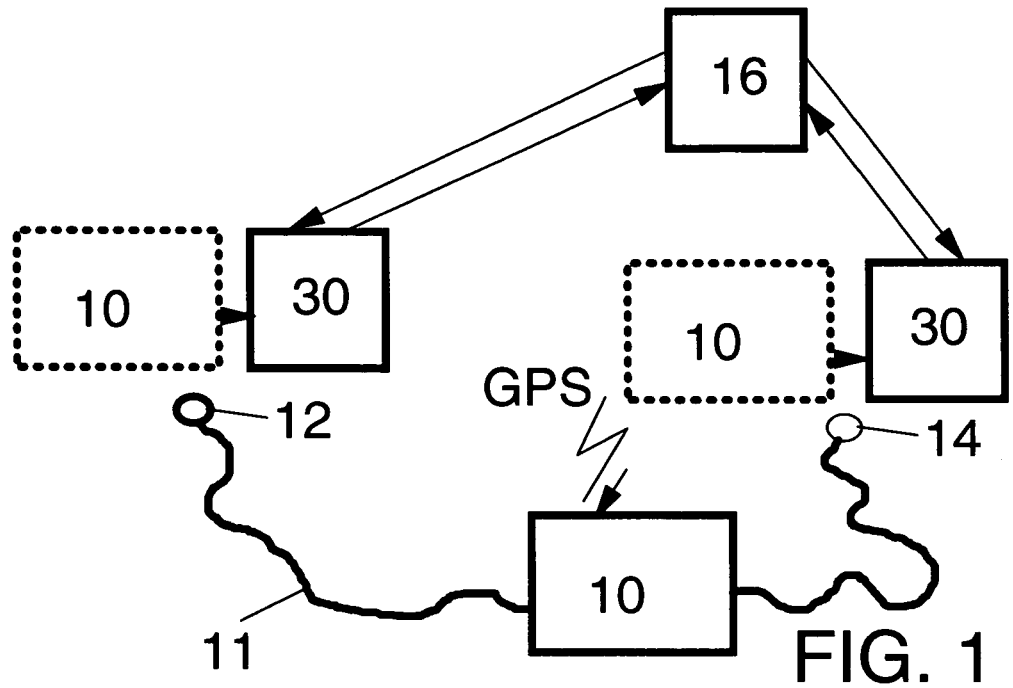
FIG. 1
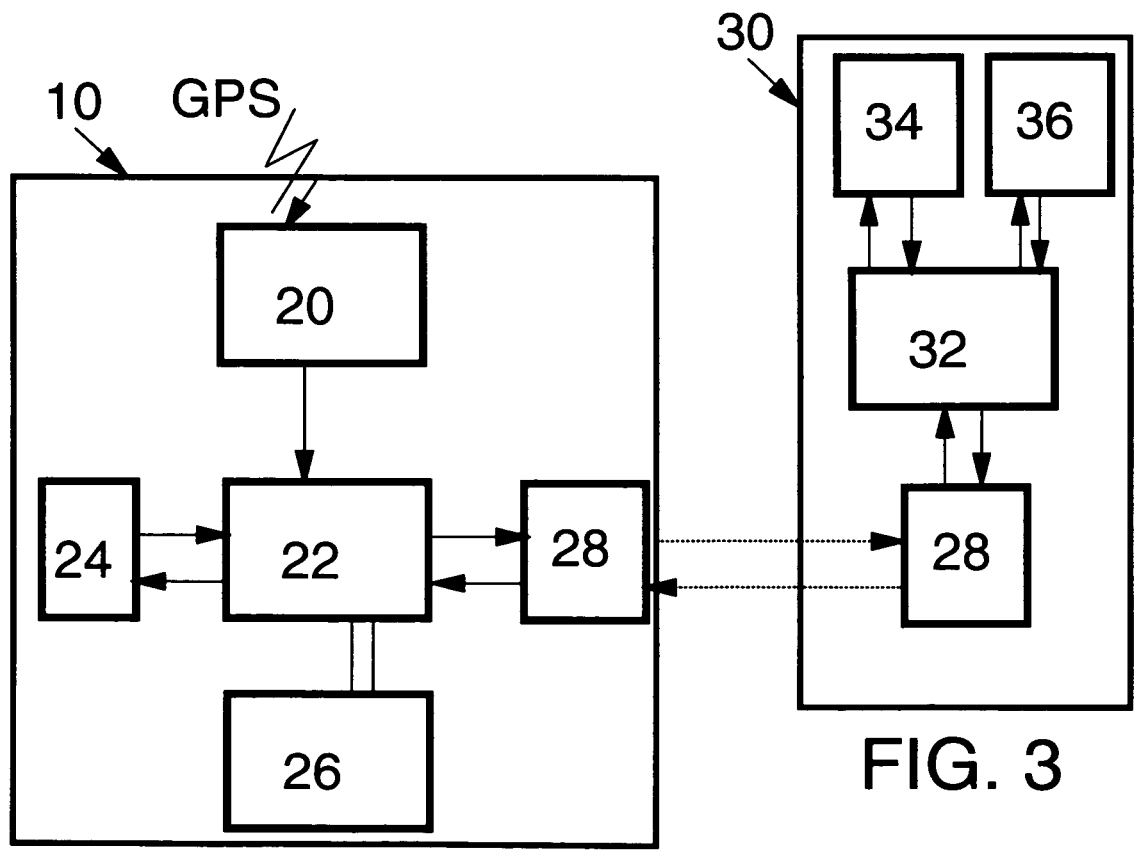
FIG. 2
FIG. 3

METHOD AND SYSTEM FOR LOGISTICS QUALITY OF SERVICE MEASUREMENTS USING GPS

FIELD OF THE INVENTION

The present invention relates to supply chain management. More specifically, it relates to supply chain monitoring and to a method and device for monitoring the quality of service of logistic services according to the preamble of claim 1.

BACKGROUND OF THE INVENTION

Supply chain management is a common problem for any organization that deals with the transportation of a large number of goods over a wide geographic area. Point-in-time-delivery is a major task for providers of logistic services as this is increasingly demanded by their clients. This is in particular true for manufacturing companies, where the successful supply of raw materials to make components, and components to make goods, is essential to the business goal of the manufacturing company. Thus, it is an important issue to monitor goods which are shipped from their source location to their destination location.

The international patent application WO 02/47048 discloses a method for real-time tracking of goods in a supply chain wherein a radio-frequency-ID tag is affixed to each good to be tracked or to each conveyance that is used to store or carry the goods, and in which the location of such good is marked at a few fixed service points en route by way of a contactless RF-ID marking between the tag affixed to the good and a so-called data appliance, i.e. a tag reader device which is provided at the service point. Such service points include intermediate stations, in which the goods are reloaded from one carrier device to another one when distributing the goods for example in a typical grocery supply chain. Dependent on the nature of the supply chain and the length of the route more or less such service points exist. When the tag is read at such service points a data set is generated including a time stamp, the tag-ID and the service point-ID. Such data are collected in a respective site server located at said service point and may be uploaded to a centralized "data center" which is used for billing purposes for example.

Although goods can be tracked in regard to time and location in a computer-based way some disadvantages remain, however.

When applying the teaching of this disclosure for the purpose of monitoring the quality of service of logistic services, manually-initiated marking is required according to this method, because for marking the location of a good, a passive RF-ID-tag must be passed by a respective RF-ID-tag reader device nearby, in order to generate a marking data set correctly. An active RF-ID tag can tolerate a wider distance from the reader, but is even more expensive. Any manual, human intervention, however which is necessary en route increases the costs of the logistic services provider.

Secondly, only a few, fixed marking points can be used during the travel time, because the above-mentioned RF-ID-tag reader devices are installed only at a respective few service points, when the goods are handled for regrouping them into more granular packages for the purpose of distribution, for example, or for any other reloading from one to the other carrier device. For many goods, however in particular when they are of higher value it would be desirable to have more tracking data, in particular such tracking data, which is recorded directly within the geographic travel in between the above-mentioned service points. Assume a case, in which such service points are hundreds of kilometers distant from each other, it would be strongly desired to be able to track time and location directly en route in order to discover situations in which the goods are not moved during their travel, for example because the truck driver who performs the transport of the goods is involved in an accident, or the truck does not move anymore because of any technical defect, or due to any other situations, like traffic jams, overnight resting time situations, and the like. All these situations happen always between such service points and are not tracked and are thus not retrievable in any post processing done for evaluation purposes, in order to monitor or improve the quality of logistic services as mentioned above.

Further, when applying the prior art method as mentioned above for controlling the quality of service of a logistic services provider no useful means is offered in this prior art method for guarantying that a test shipment of the goods is done according to objective boundary conditions because the human intervention required at the service points imply some subjective influence on the speed, in which such good is handled, because it is obvious that staff members knowing that sometimes a test shipment of particular goods is performed, would speed up the handling of such packages, if they were visibly provided with such an RF-ID-tag.

In the prior art method as mentioned above the use of global positioning service (GPS) data is disclosed in the context of the above-mentioned marking step, which takes place only at the above-mentioned service points. It is not disclosed, however in which way such GPS data is set in context with the good itself nor can be derived any useful teaching, how to use GPS data in the context of monitoring such goods.

OBJECTIVES AND SUMMARY OF THE INVENTION

It is thus an object of the present invention to provide a method and respective system for improved monitoring and after the fact tracking of goods being shipped along their route.

This objective of the invention is achieved by the features stated in enclosed independent claims. Further advantageous arrangements and embodiments of the invention are set forth in the respective dependent claims. Reference should now be made to the appended claims.

According to the broadest aspect of the present invention a method for monitoring the quality of service of logistic services is disclosed, wherein goods are shipped along a travel route from a source location to a destination location, and wherein geographic locations and times are logged at one or more locations during the travel, which is characterized by the steps of:

a) shipping a shipping device, ie a package, letter, parcel, etc., comprising an electronic device, said device comprising:
aa) a GPS-indoor receiver device (including an antenna) operatively connected to a control logic,
bb) a storage operatively facility connected to said control logic,
cc) a power supply,
dd) an I/O interface;
ee) wherein said control logic is arranged for processing received GPS data and for logging, ie repeatedly storing during the shipping device traveling time, respective current datasets comprising at least the current Time of Day and the geographic location information derived from GPS signals received en route, b) reading out the log data via said I/O interface, and c) evaluating the log data according to predetermined rules reflecting the Quality of Service of the actual shipping device travel.

According to this basic approach a monitoring method is provided which does neither require any human intervention nor any technical infrastructure en route. Further, the data collection rate, in which data for monitoring and evaluating the quality of service, is increased remarkably with respect to prior art.

Under the term "GPS-indoor-receiver" a device is understood which is able to receive GPS-data even when they are encapsulated nearly totally by a metal casing as it is the case for example when the goods are transported by way of a truck or by way of a container as they are used in railway shipping. Such "indoor-GPS-systems" are commercially available from Global Locate, Inc. of San Jose, Calif.

The type and the size of the storage device may vary according to the actual needs, in particular according to the granularity desired for the monitoring process. It must of course be larger the longer is the awaited travel time, or the higher the log data rate is desired. For example a Secure Digital or other low cost consumer memory card (RAM) may be used for this purpose.

In an overall scenario in which the above-mentioned electronic device which is further referred to as "location logging device" and abbreviated as LLD device, cooperates with a respective LLD host device which is able to readout the log data, recharge the device and possibly performs further quality of service evaluation tasks the remarkable advantage is obtained that no infrastructure is needed along the route, as it is required in prior art in form of the RF-ID reader devices at the above-mentioned service points. Thus, when such inventive LLD host devices are located, for example, at the source location of the travel and at the destination location of the travel and such host devices are able to initialize the log storage of the LLD device with the GPS compliant geographic coordinates of the source location and the destination location, and when they are programmed to perform a respective reset in order to enable such LLD device to be reshipped for the next travel, then a precise monitoring within the scope of the present invention is provided without any other infrastructure being required. This results in a considerable decrease of costs and increase in monitoring quality.

When the source location and destination location of the transport route are stored within the storage of the LLD device the addressing of the correct GPS satellites for receiving the GPS data is simplified and no need for assisted GPS (A-GPS) is needed.

Further, in order to save memory space, only delta-information relative to a predetermined, preceding time information can be logged instead of repeatedly logging the full time information. The same is basically true for the storage of geographic coordinates.

Further advantageously, as a part of the above-mentioned initialization procedure performed by the LLD host device a log data rate can be set in order to adjust the precision of the monitoring process to the actual needs of the monitoring person and to the total time of the travel. The LLD device should comprise at least the above-mentioned GPS-indoor-receiver, the storage facility, an autonomous power supply, for example in form of batteries and an I/O-interface, for example USB, or any other which matches the current needs of post processing computer devices. The time information can basically be obtained by extracting it from the received GPS signal. Thus, the LLD device may only optionally be provided with an autonomous system clock arranged for generating a time stamp for a respective log data set in an autonomous way independently of the GPS data.

The LLD host device may further be implemented other than in the obvious form of a PC computer in the form of a small scale computing device with strongly reduced I/O-facilities, i.e. without a major display and without the classic keypad, but instead with an interface to a network, for example the Internet in order to be able to automatically forward the log data after being readout from the LLD device to a dedicated log data evaluation server, which is dedicated to receive such log data from all over the world, store the data in a respective data base and run a respective log data evaluation application from the collected log data. The LLD host device has advantageously also the capability to recharge the LLD. Thus, the inventive monitoring method can be performed easily and without major costs in a large-scale manner collecting and processing the log data from many different locations all over the world.

It may be applied in various fields, for instance, for monitoring the pathways of prisoners temporarily set free from prison. After a check-in when they come back to prison from an on-leave trip with the LLD sealed at a leg during their trip, the LLD log data can be analysed for knowing, whether or not they have left an allowed, predetermined geographical region.

A similar application exists for rental cars. A LLD can be affixed to it at a secret place, and after bringing back the car to the rent station, it can be checked, whether or not the car has left an allowed geographical region.

BRIEF DESCRIPTION OF THE DRAWINGS

The present invention is illustrated by way of example and is not limited by the shape of the figures of the drawings in which:

FIG. 1 is a schematic block diagram representation showing in an overview all essential system elements involved in the inventive method according to a specific embodiment thereof;

FIG. 2 is a schematic block diagram representation illustrating the essential system components of an LLD device according to a preferred embodiment of the invention;

FIG. 3 is a schematic block diagram representation illustrating the essential system components of an LLD host device according to a preferred embodiment of the present invention;

DETAILED DESCRIPTION OF THE PREFERRED EMBODIMENT

Figure 4:
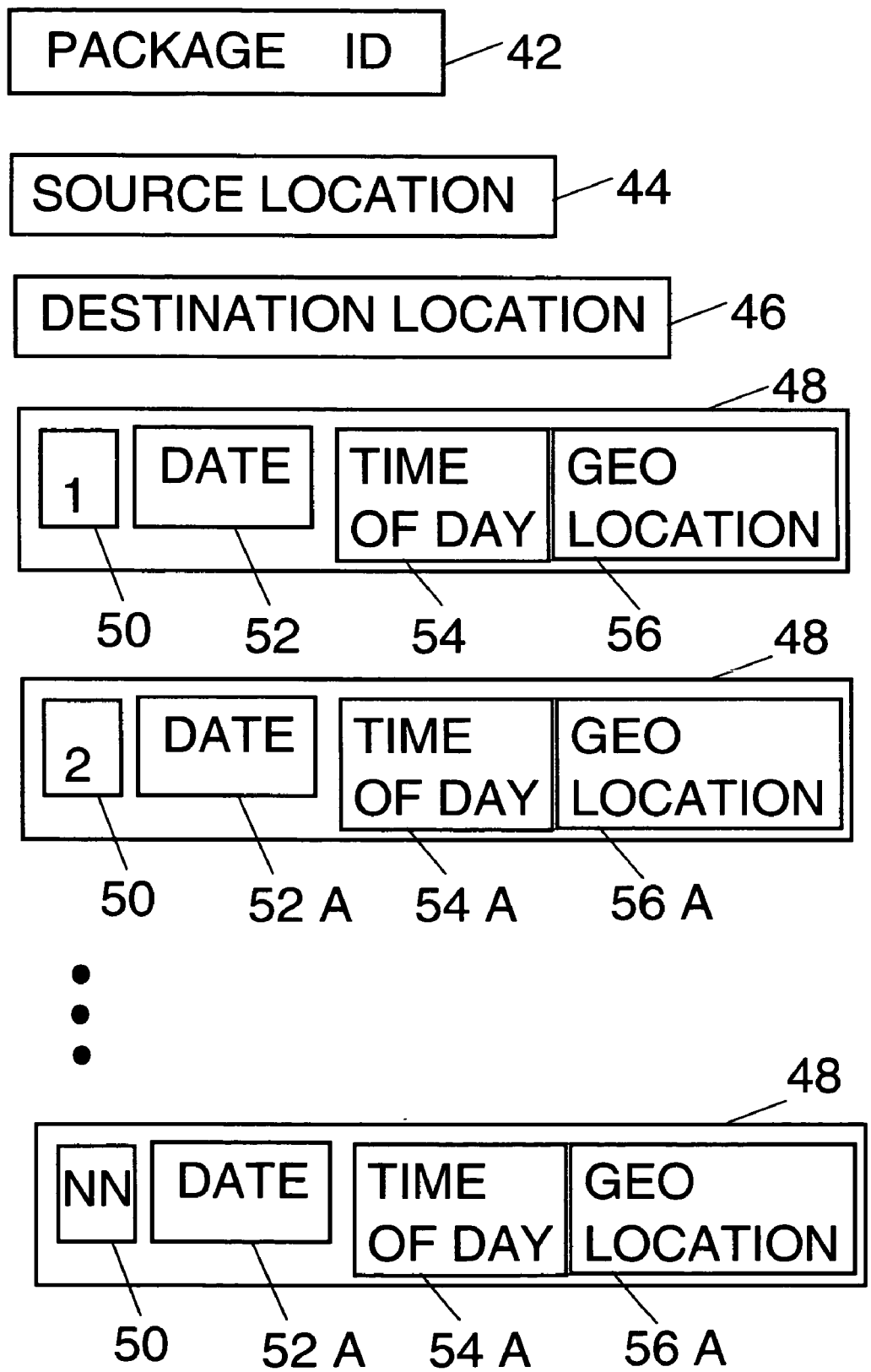
FIG. 4 is a schematic block diagram representation illustrating the logic structure of log data collected according to a preferred embodiment of the inventional method.

With general reference to the figures and with special reference now to FIG. 1 an inventive electronic GPS data logger device (LLD 10) is shown during the travel between a source location 12 and a destination location 14. The dotted lines of frame 10 indicate the situations, in which its initialization at the source location 12 and the data readout at the destination location takes place in cooperation with an LLD host device 30 situated for example at both, start location 12 and destination location 14. During its travel time the LLD device 10 is shown to receive GPS data as indicated in the drawing. The LLD host devices may be connected via a remote connection to a log data evaluation server 16. Said server 16 may receive log data when they are readout by an LLD host device 30 and may update the software implemented therein, if necessary. The travel route is depicted with the freehand line 11 between locations 12 and 14 and the LLD device 10, respectively.

With reference now to FIG. 2 an inventive LLD 10 comprises as basic components a GPS-indoor-receiver-unit 20 in the form of a GPS chip, which needs only GPS data receive capability. A control logic 22 is the central processing unit of the LLD device 10. It is operatively connected to said receiver unit 20, further to a storage facility 24 for example in form of e.g. a "Secure Digital" memory card which is able to store data processed by control unit 22 permanently preferably, even if a power supply 26 connected to all components has a breakdown. Further, the processing unit 22 may be implemented by a low performance processor, for example an "Arm processor", as it is commercially available from Altera, Corporation of San Jose, Calif. Further, an input/output (I/O-interface) 28 is provided for data exchange with a respective LLD host device 30 further described with reference to FIG. 3. All components depicted in FIG. 2 are mounted on a respective processor card which is in turn packed within a flat plastic casing. The device will be as small as possible, e.g. the size of a PCMCIA card.

In this embodiment LLD 10 is shown to be implemented without its own system clock as the time information can also be extracted from the GPS signal.

With reference now to FIG. 3 the system components of an LLD host device 30 are described in more detail, as far as they are relevant for the purpose of the present invention. Basically an off the shelf personal computer (PC) can be used as LLD host device 30. The functional components required specifically for the interaction with the LLD 10 as described above are a central control logic 32 in the form of a processor unit which is programmed such that the log data from storage 24 of the LLD device may be readout via a common interface depicted as 28, and as shown with the dotted lines connecting between FIG. 2 and FIG. 3. In this preferred embodiment such interface may be for example an USB (Universal Serial Bus) interface. Of course, other interfaces can be implemented.

According to a preferred aspect of the present invention LLD host device 30 comprises a functional program component 34 which may be used for adjusting the time rate, according to which the log data will be stored, further to set a particular start time of the logging procedure and other initialization of storage 24 of LLD 10. Further, an interface to a network communication 36 is provided in order to enable the LLD host device to forward the data to the above-mentioned evaluation server 16, for example via a public network, for example the Internet. The means for setting the log data storing frequency as mentioned above may be implemented in the form of a key pad or other appropriate input device. A feedback output device is provided in order to control the setting (not depicted in the drawing for sake of improved clarity).

Figure 5:
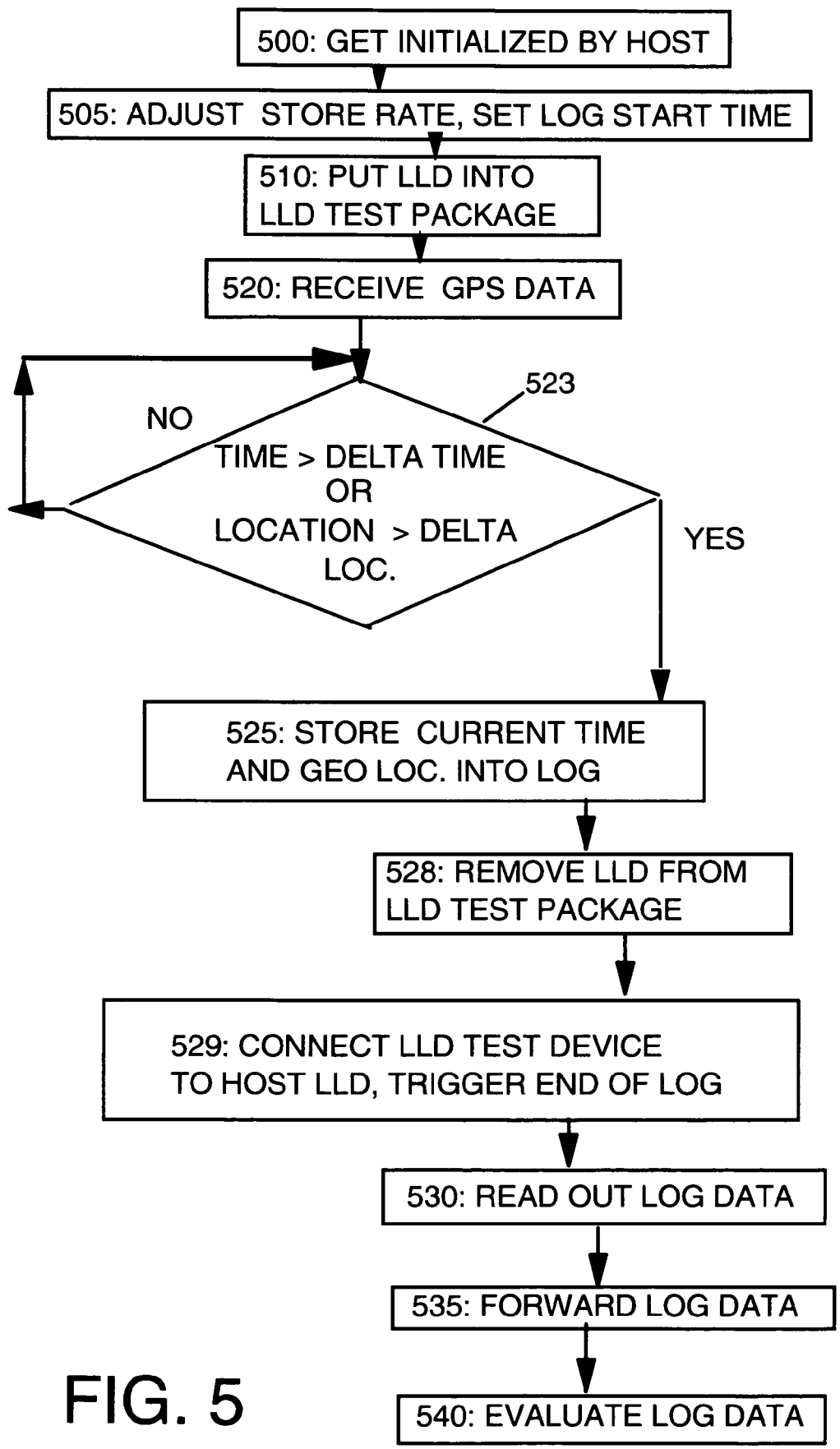
FIG. 5 is a schematic block diagram representation illustrating relevant process steps involved in a preferred embodiment of the invention.

With reference now to FIG. 4 and FIG. 5 the basic operational aspects of LLD 10 and LLD host device 30, as well as of a central LLD evaluation server 16 will be described in more detail:

In a step 500 the LLD 10 is initialized, which is also indicated in FIG. 1, dotted frame, left margin. In particular, a shipping device ID 42 is input telling the operator the identity of the parcel or any other conveyance, in which the LLD 10 is transported within the shipping process, step 510.

This ID 42 may be an integer, a character string or any other appropriate key. Further, in a field 44 the source location and in a field 46 the destination location is entered into the LLD device during its initialization. At least the destination device is preferably entered in a data format which is compliant to or can easily be derived from GPS geographic coordinates in order to enable for a simple matching when the end of the data logging procedure shall be determined, see step 523 further below. This is true only for embodiments, in which the destination location is used for deciding to continue logging or not. In the embodiment depicted in FIG. 5, a different criterion is used therefore, see further below.

In a further step 505 the store rate is adjusted for example to a frequency of 2 per minute, i.e. every 30 seconds a log data set will be generated. Of course this selection may be varied in a large range in order to match best the actual needs of the person who wants to monitor the shipping process. Further, preferably the start time is set, at which the logging of the GPS location and the current time will begin. This of course is an optional step, which is recommended because of the time delay between initialization of the LLD and the actual start of the shipping process after having put the LLD into a suitable test package, which is depicted as step 510 in FIG. 5.

As soon as LLD 10 is initialized it begins to receive the GPS data, step 520. Before the start time set as described above is reached, the GPS data is only received but not stored. The start time for beginning the logging procedure is determined by comparing, step 523, the current time as it is extracted from the GPS signal with a preceding, predetermined time. If the difference is greater than a predetermined delta value, for example one (1) minute, or if the current location has exceeded a respectively defined distance from a previously stored geographic location, e.g., it is more than a distance of 1 km, then the current time and current geo-location is stored. Of course, when the LLD 10 further comprises its own, autonomous system clock, said time information can be used alone or in combination with the GPS time information.

If either criterion is true, then the YES branch of decision 523 is taken, and the first log data set is generated and stored into the storage device 24 of the LLD 10 in step 525. Such a log data set is depicted in FIG. 4 with reference sign 48. It comprises an integer index field 50 increasing from a value of 1 to an indefinite value, which is yielded when the LLD 10 has arrived at its destination location. This is depicted with NN at the bottom of FIG. 4. Further, preferably a date field 52 is provided in order to determine at least the current date of the beginning of the shipping procedure. In the following data sets, which are created according the preset repetition rate as mentioned above the date field 52 need not necessarily be stored in order to save storage space. Further, a time of day field is provided in the log data set indicated with reference sign 54. This may be in the format of hh:mm:ss in order to indicate hours, minutes and seconds. In respective further data fields 56 the geographic location is stored preferably in the format given by the GPS, e.g. latitude and longitude. Possibly the altitude above sea level (which is available, if at least 4 satellites can be detected by the GPS) can also be stored.

Also the time for logging the second and all succeeding log data sets can thus be determined by extraction of the GPS time information. Thus, during the long travel the log data is stored sequentially. According to a preferred aspect of the present invention only delta values are stored in the data fields 54 A for the time of day and for the geographic location 56 A, in order to save storage space, as it will be appreciated by a person skilled in the art. Finally, at the end of the travel the LLD is removed from the test package, step 528. Preferably now no more log data shall be stored. Then, in a step 529 the LLD test device is connected with the before-mentioned LLD host device 30, which triggers the end of the logging loop, and the log data can be readout in a step 530 from the LLD 10 via the interfaces 28. Of course different criteria can be implemented to quit from the logging loop, which depends of the actual application of the inventive method. For instance, the logging can be stopped, when the current geo-location coincides within predetermined tolerances with the destination location stored in the LLD.

Figure 6:
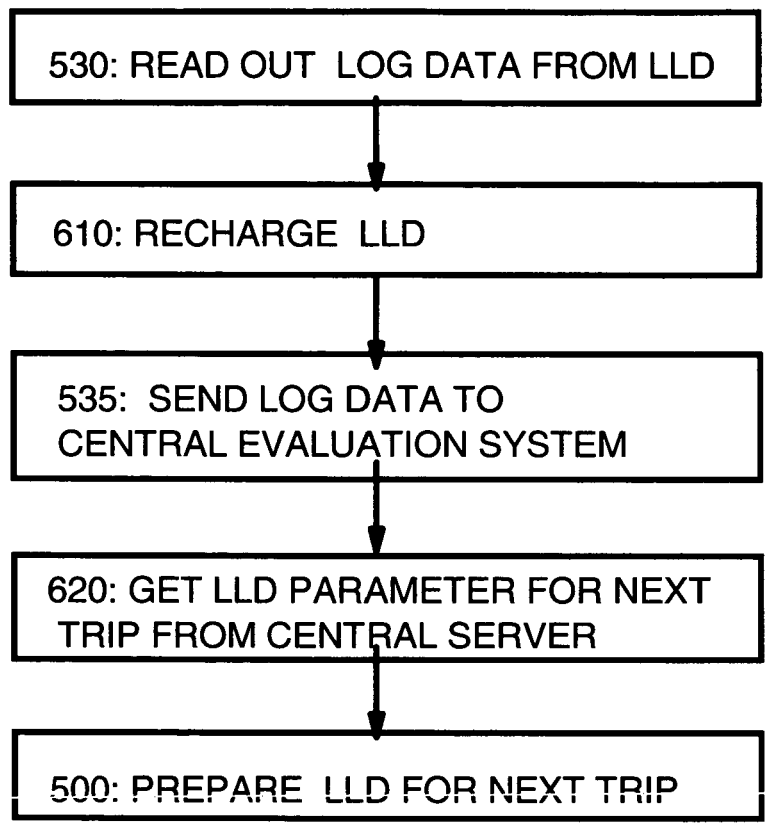
FIG. 6 is a schematic block diagram representation illustrating relevant process steps according to a preferred embodiment performed by the LLD host.

With additional reference to FIG. 6 the respective operations of LLD-host 30, and with reference to FIG. 7 the respective operations of said central evaluation server 16 are summarized as follows:

The LLD-host device 30 reads out the log data from a LLD, step 530. Further it recharges the accumulator devices of the LLD, step 610. Further, the log data is sent in a step 535 via Internet to a dedicated Log data Evaluation Server in order to enable a global evaluation of such LLD log data all over the world. In step 620 the LLD parameter needed for initialization of the just processed LLD is requested and is received, if it exists. After receiving that the LLD 10 can be prepared for the next trip, see step 500 above.

Figure 7:
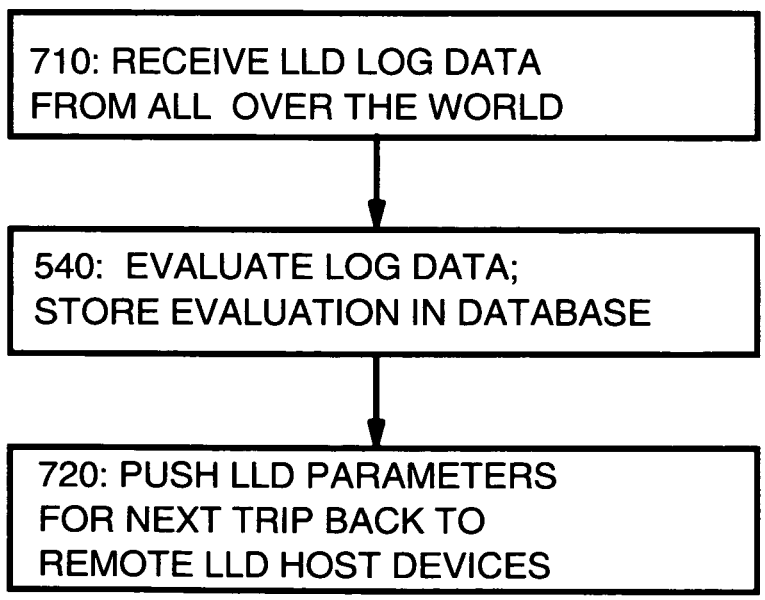
FIG. 7 is a schematic block diagram representation illustrating relevant process steps according to a preferred embodiment performed by a central log data evaluation server, (LLD central server).

In FIG. 7 the respective counterpart operations of the evaluation server are depicted.

In step 710 said server receives the log data. This is true for a plurality of LLD from all over the world. The Internet may be used if appropriate.

In a step 540 all such log data is evaluated, statistics are calculated and the most interesting parts thereof are assembled into an adequate report form.

In step 720 new LLD parameters are pushed to the actual LLD in order to prepare it for the next trip.

The present invention can be basically implemented as described above or in various modifications thereof in order to monitor the quality of service of a logistic services provider as it was detailed in the background part above. A remarkable advantage should reveal from the above description saying that it is possible to secretly monitor the shipping procedure with fairly low cost, reusable devices, which enables for large scale use of the inventive method both, large in space and large in time, i.e. logistic services providers can be monitored very extensively. It should be understood that also shipping services of shorter distance, for example within the geographic region of one and the same city can be excellently monitored due to the high spatial resolution of GPS in the order of 10 meter and due to the free adjustment facility of the data logging rate, and due to the fact that large storage capacities are commercially available in the low cost sector, already.

The present invention can be realized in hardware, software, or a combination of hardware and software. A tool according to the present invention can be realized in a centralized fashion in one computer system, or in a distributed fashion where different elements are spread across several interconnected computer systems. The Internet can be used to communicate the data between the LLD and the host. Any kind of computer system or other apparatus adapted for carrying out the methods described herein is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of The following:

a) conversion to another language, code or notation;

b) Reproduction in a different material form.

The invention claimed is:

1. A method for monitoring the quality of service of logistic services, comprising:

receiving global positioning service (GPS) data from a GPS at a current time and current location, said receiving being performed by a location logging device (LLD) comprised by a shipping device while the shipping device is being shipped along a travel route from a source location to a destination location, wherein the current location is along the travel route, and wherein the received GPS data comprises the current time and the current location; and storing log data in a storage of the LLD if a condition is satisfied, said log data comprising the current time and the current location of the received GPS data, said condition being that the current time exceeds a specified predetermined time by more that a specified time differential or a distance between the current location and a prior location stored in said storage exceeds a specified distance, otherwise looping back to said receiving GPS data.

2. The method of claim 1, wherein the method further comprises:

prior to said receiving GPS data, putting the LLD in the shipping device.

3. The method of claim 2, wherein the method further comprises:

prior to said putting the LLD in the shipping device, adjusting a frequency rate at which said receiving GPS data shall occur subject to said condition being satisfied.

4. The method of claim 3, wherein the method further comprises:

prior to said adjusting the frequency rate, connecting the LLD to a host device, wherein the host device performs said adjusting the frequency rate.

5. The method of claim 2, wherein the method further comprises:

prior to said putting the LLD in the shipping device, initializing the LLD, wherein said initializing the LDD comprises storing the source location and the destination location in the storage of the LLD.

6. The method of claim 1, wherein the method further comprises stopping said receiving upon determining that the current location is the destination location.

7. The method of claim 6, wherein the method further comprises:
   after said stopping said receiving, removing the LLD from the shipping device.

8. The method of claim 7, wherein the method further comprises:
   after said removing the LLD from the shipping device, connecting the LLD to a host device followed by reading out the log data from the storage of the LLD to the host device.

9. The method of claim 8, wherein the method further comprises:
   after said connecting the LLD to the host device, receiving by the LLD a recharge from the host device.

10. The method of claim 8, wherein the method further comprises:
    transmitting the log data from the host device to an evaluation server via a network, for evaluation of the log data by the evaluation server according to predetermined rules.

11. The method of claim 10, wherein the network comprises the Internet.

12. The method of claim 1, wherein the shipping device comprises a letter.

13. The method of claim 1, wherein the LLD comprises a system clock, and wherein the method further comprises generating a timestamp for the log data based on a time from the system clock.

14. The method of claim 1, wherein the shipping device is shipped to the destination via a rental car, wherein the rental car is returned to a rental station after the shipping device has been shipped to the destination, and wherein the method further comprises:
    after the rental car has been returned to the rental station, checking the LLD to determine if the rental car had left an allowed geographical region while being shipped to the destination.

15. The method of claim 1, wherein the stored log data further comprises a current date.

16. A computer program product stored on a computer usable medium comprising computer readable program means for causing a computer to perform the method of claim 1, when said computer program product is executed on a computer.

17. The method of claim 1, wherein the LLD comprises a control logic processing unit, a GPS-indoor-receiver-unit, a storage facility for storing data processed by the control logic processing unit, an input/output (I/O) interface for exchanging data with a LLD host, and a power supply, and wherein the control logic processing unit is directly connected to the GPS-indoor-receiver-unit, the storage facility, the I/O interface, and the power supply.

18. The method of claim 17, wherein the method further comprises:
    reading out the stored log data via said I/O interface; and
    after said reading out the stored log data, evaluating the log data according to predetermined rules reflecting the quality of service of the actual shipping device shipping.

19. A computer program for execution in a data processing system comprising computer program code portions for performing respective steps of the method according to claim 18, when said computer program code portions are executed on a computer.

20. A computer program product stored on a computer usable medium comprising computer readable program means for causing a computer to perform the method of claim 18, when said computer program product is executed on a computer.

* * * * *